United States Patent
Dabas et al.

(10) Patent No.: US 11,461,779 B1
(45) Date of Patent: Oct. 4, 2022

(54) MULTI-SPEECHLET RESPONSE

(71) Applicant: Amazon Technologies, Inc., Seattle, WA (US)

(72) Inventors: Rohin Dabas, Kirkland, WA (US); Troy Dean Schuring, Maple Valley, WA (US); Xu Zhang, Bothell, WA (US); Maksym Kolodeznyi, Seattle, WA (US); Andres Felipe Borja Jaramillo, Shoreline, WA (US); Nnenna Eleanya Okwara, Seattle, WA (US); Alberto Milan Gutierrez, Edmonds, WA (US); Rashmi Tonge, Bellevue, WA (US)

(73) Assignee: Amazon Technologies, Inc., Seattle, WA (US)

(*) Notice: Subject to any disclaimer, the term of this patent is extended or adjusted under 35 U.S.C. 154(b) by 394 days.

(21) Appl. No.: 15/934,391

(22) Filed: Mar. 23, 2018

(51) Int. Cl.
  *G06Q 20/40* (2012.01)
  *G10L 17/24* (2013.01)
  *G10L 15/187* (2013.01)
  *G10L 15/26* (2006.01)

(52) U.S. Cl.
  CPC ........ *G06Q 20/4014* (2013.01); *G10L 15/187* (2013.01); *G10L 15/26* (2013.01); *G10L 17/24* (2013.01)

(58) Field of Classification Search
  CPC ....... G10L 15/187; G10L 15/26; G10L 17/24; G10L 15/22; G10L 2015/223; G06Q 20/4014
  See application file for complete search history.

(56) References Cited

U.S. PATENT DOCUMENTS

| | | | |
|---|---|---|---|
| 9,070,366 B1* | 6/2015 | Mathias | |
| 9,424,840 B1* | 8/2016 | Hart | |
| 9,721,570 B1* | 8/2017 | Beal | |
| 9,734,839 B1* | 8/2017 | Adams | G10L 21/00 |
| 10,475,451 B1* | 11/2019 | Lynch | |
| 10,714,117 B2* | 7/2020 | Binder | |
| 2011/0112827 A1* | 5/2011 | Kennewick | |
| 2015/0348551 A1* | 12/2015 | Gruber | H04M 3/4936 704/235 |

(Continued)

*Primary Examiner* — Angela A Armstrong
(74) *Attorney, Agent, or Firm* — Pierce Atwood LLP

(57) ABSTRACT

Techniques for transferring control of a system-user dialog session are described. A first speechlet component may interact with a user until the first speechlet component receives user input that the first speechlet component cannot handle. The first speechlet component may output an action representing the user input. A system may determine a second speechlet component configured to execute the action. The system may send the second speechlet component a navigator object that results in the second speechlet component handling the user interaction that the first speechlet component could not handle. Once the second speechlet component is finished processing, the second speechlet component may output an updated navigator object, which causes the first speechlet component to either further interact with a user or cause a current dialog session to be closed. The system may additionally maintain a data structure representing calling speechlet components and called speechlet components associated with the session.

22 Claims, 12 Drawing Sheets

(56) References Cited

U.S. PATENT DOCUMENTS

2016/0070533 A1* 3/2016 Foster ................... G10L 15/22
                                                      704/275
2016/0149883 A1* 5/2016 Arunkumar
2016/0322044 A1* 11/2016 Jung
2017/0358303 A1* 12/2017 Walker
2018/0330721 A1* 11/2018 Thomson ........... G10L 15/1815

* cited by examiner

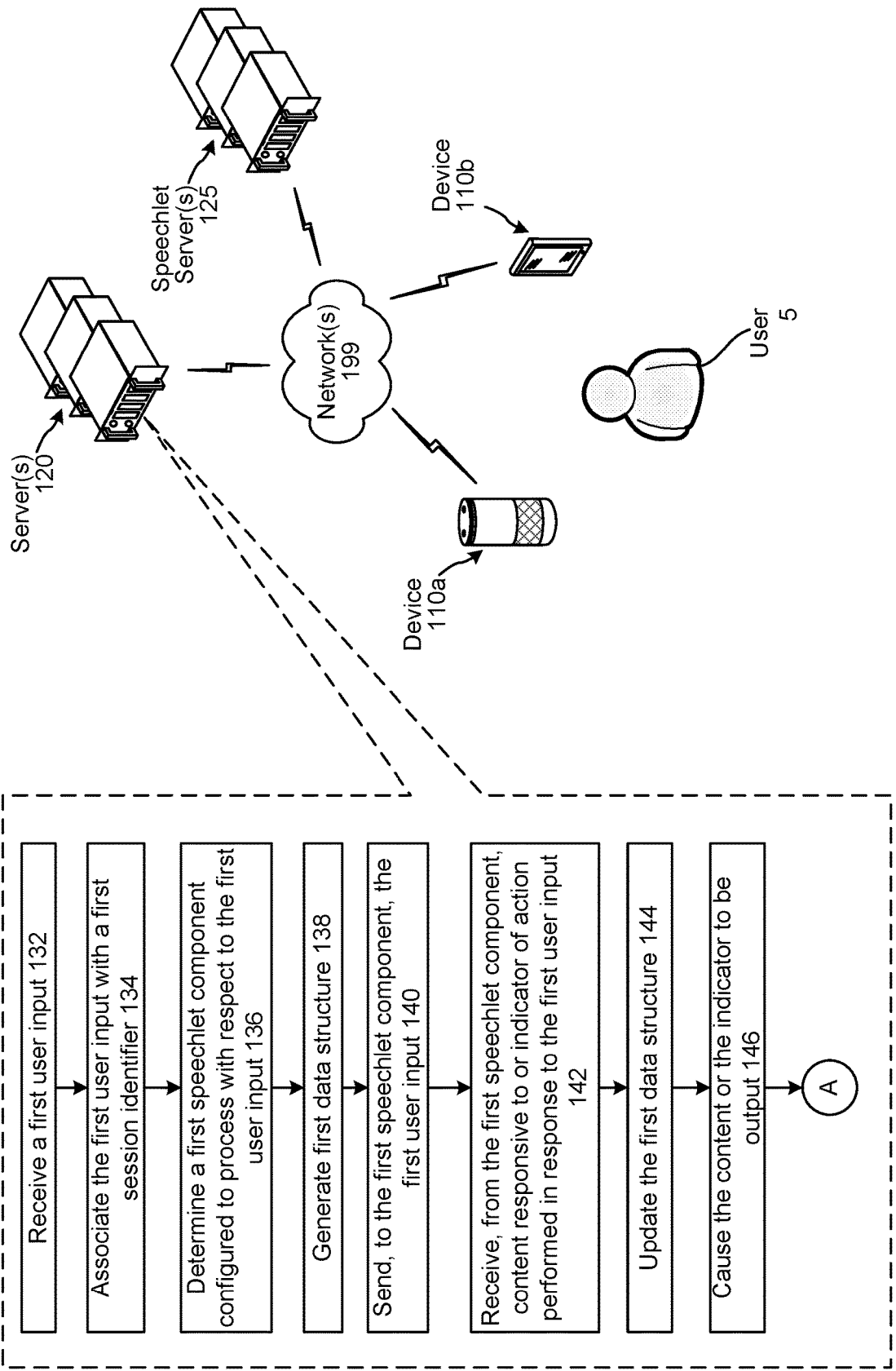

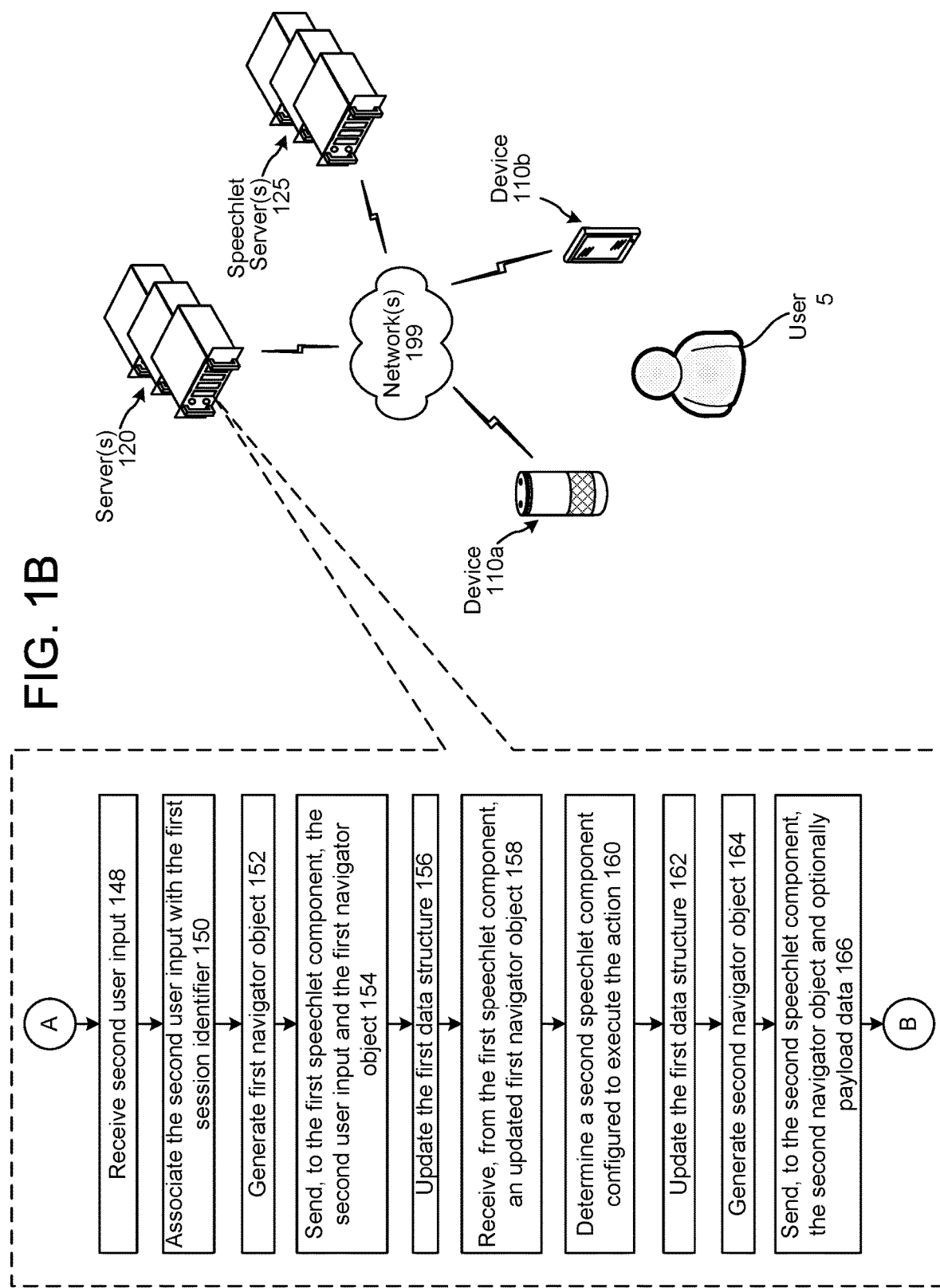

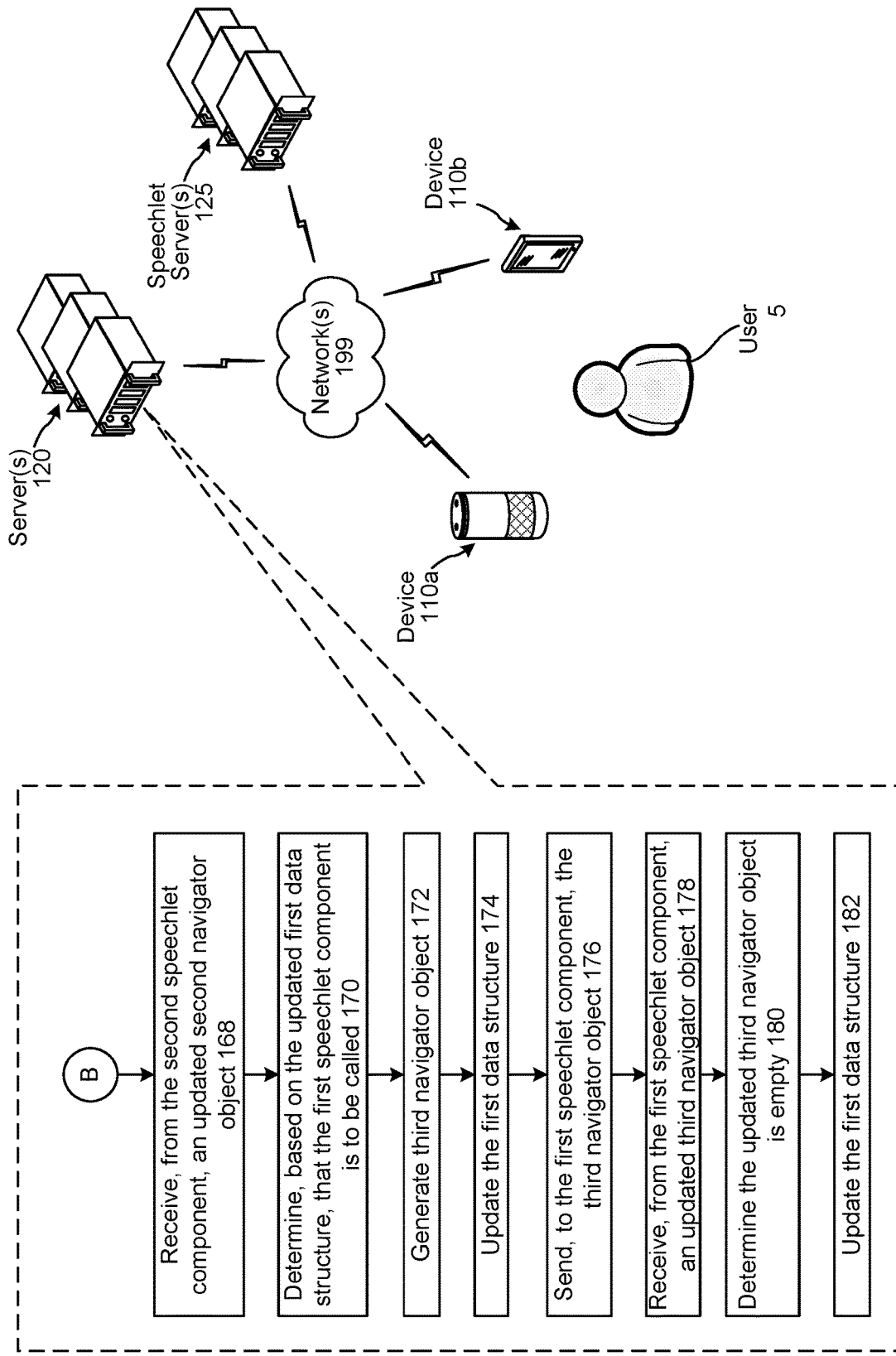

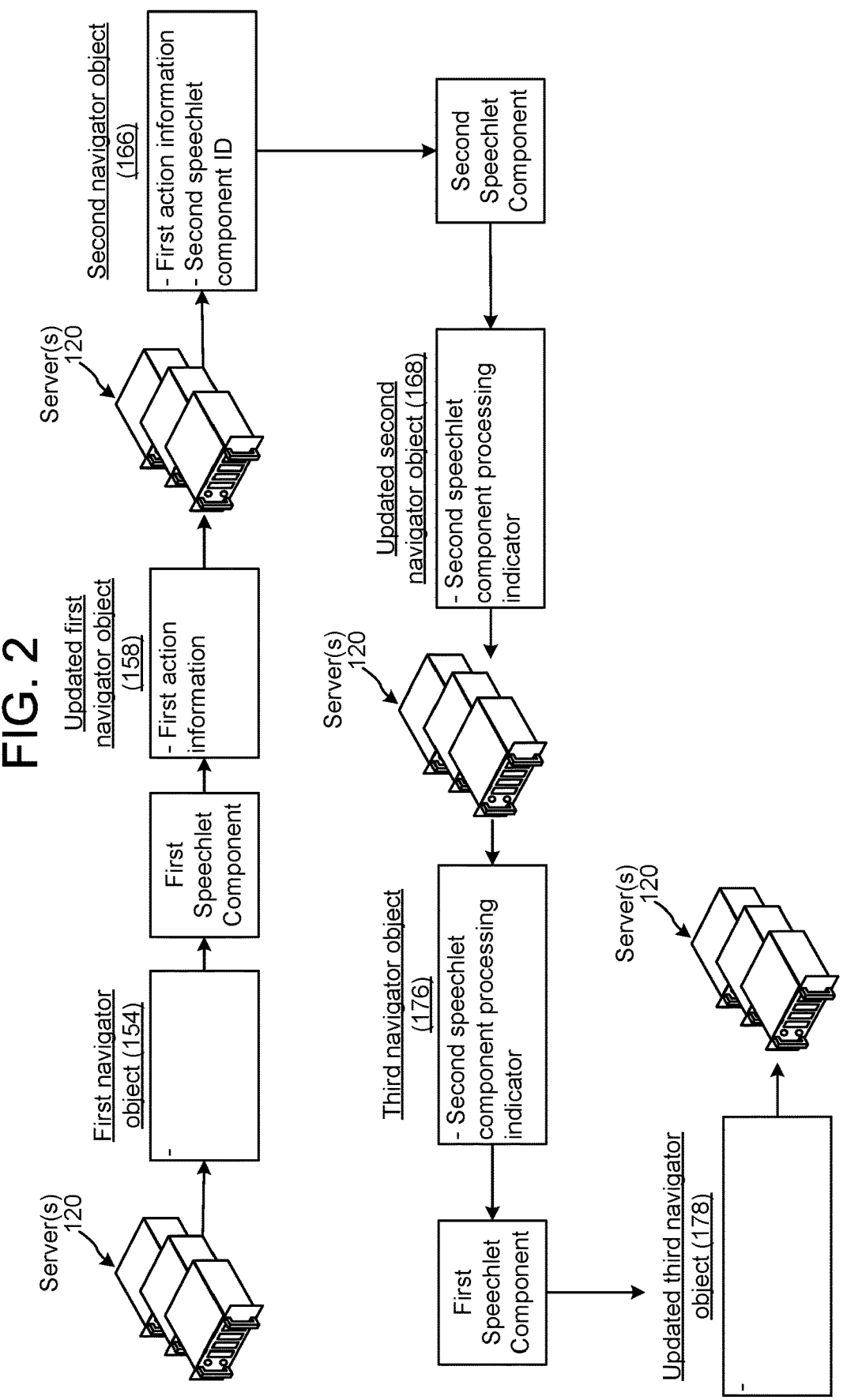

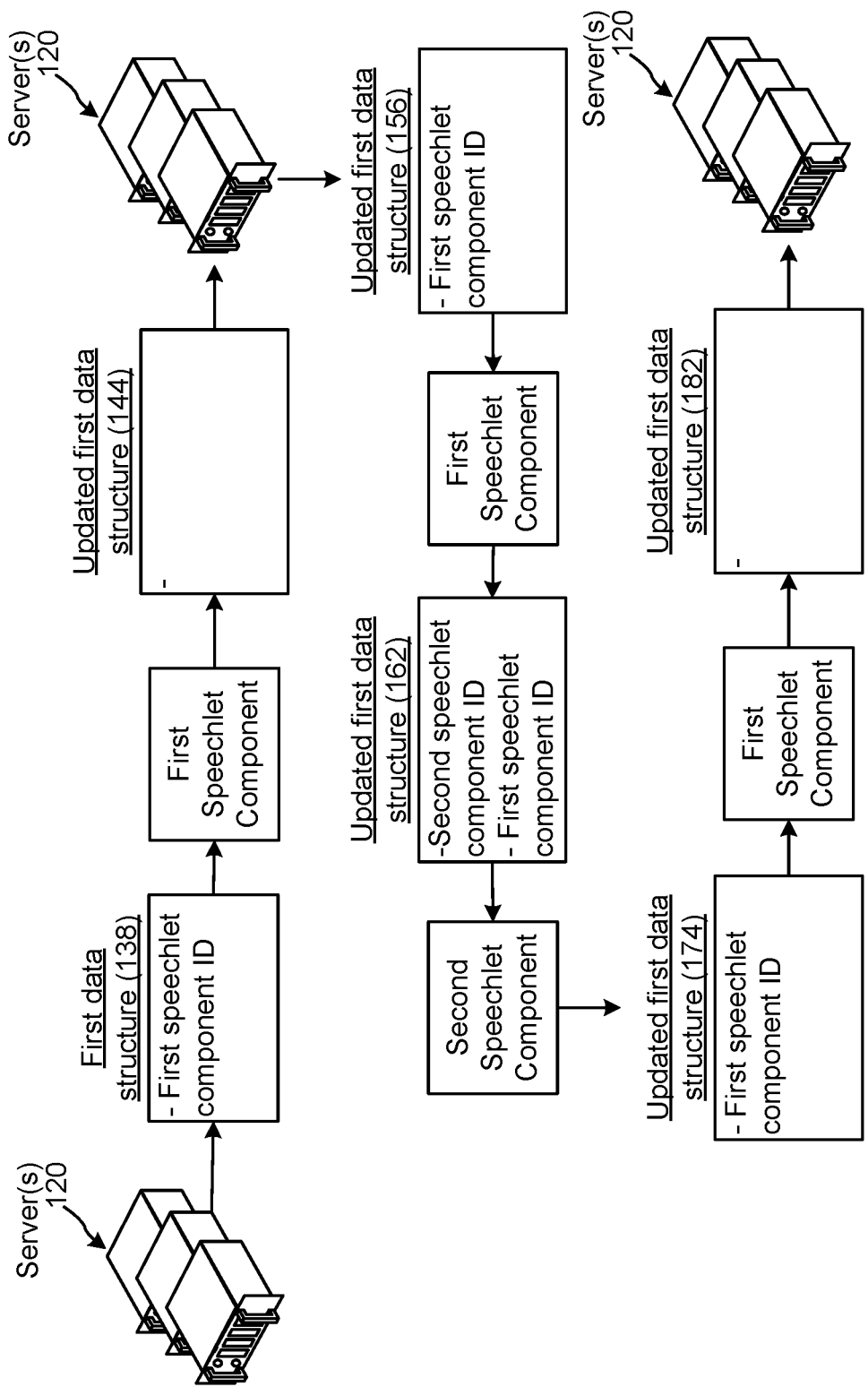

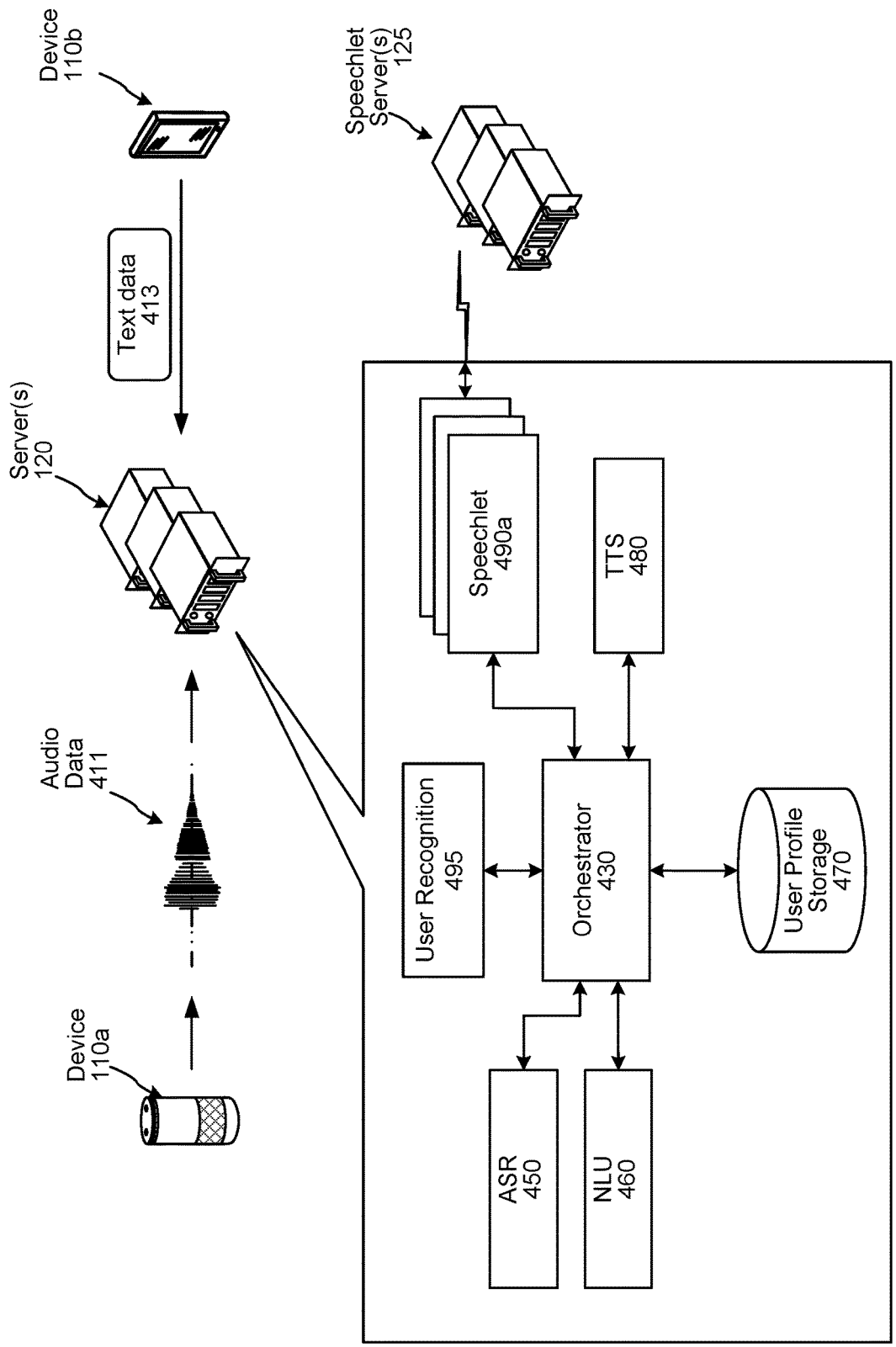

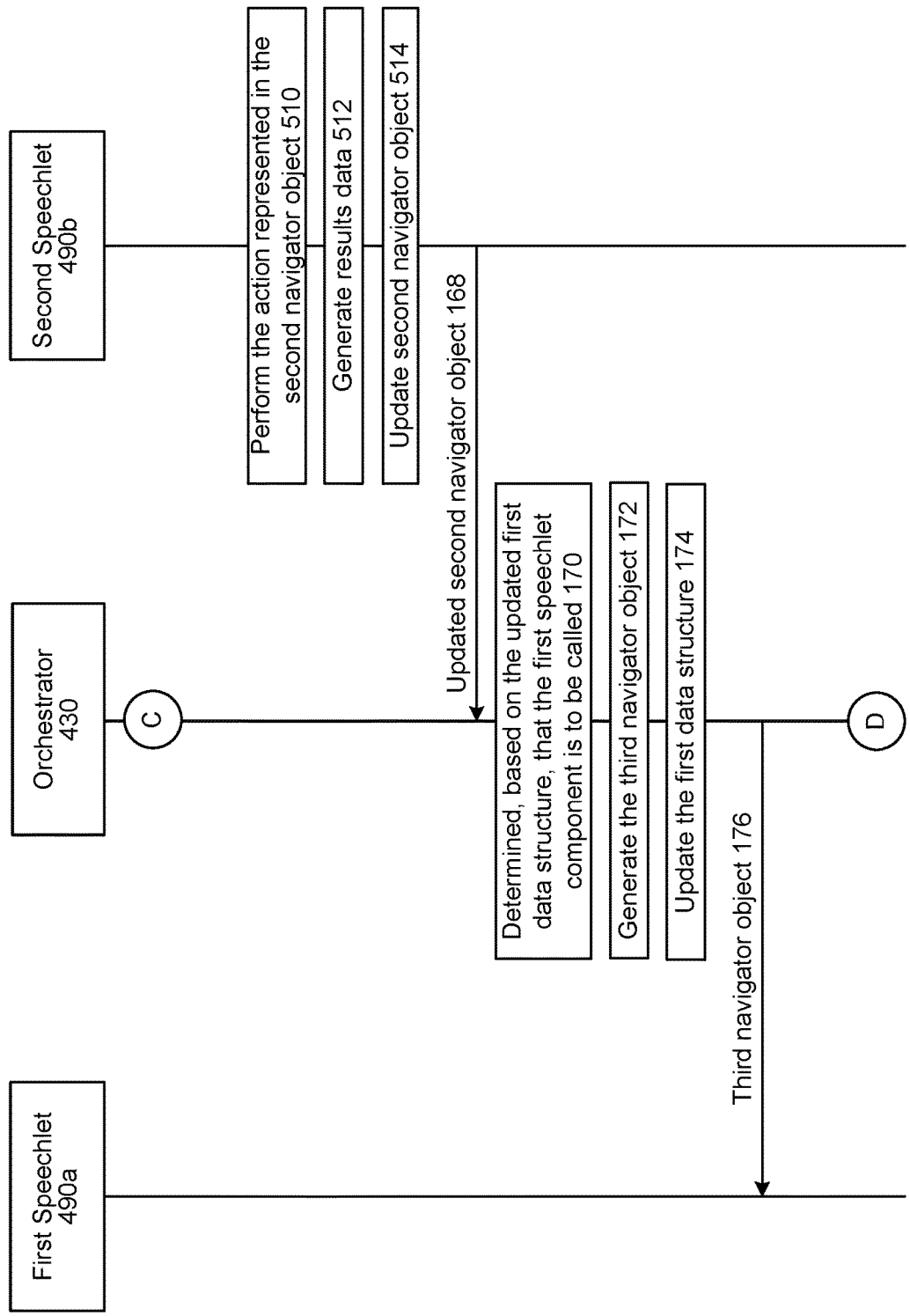

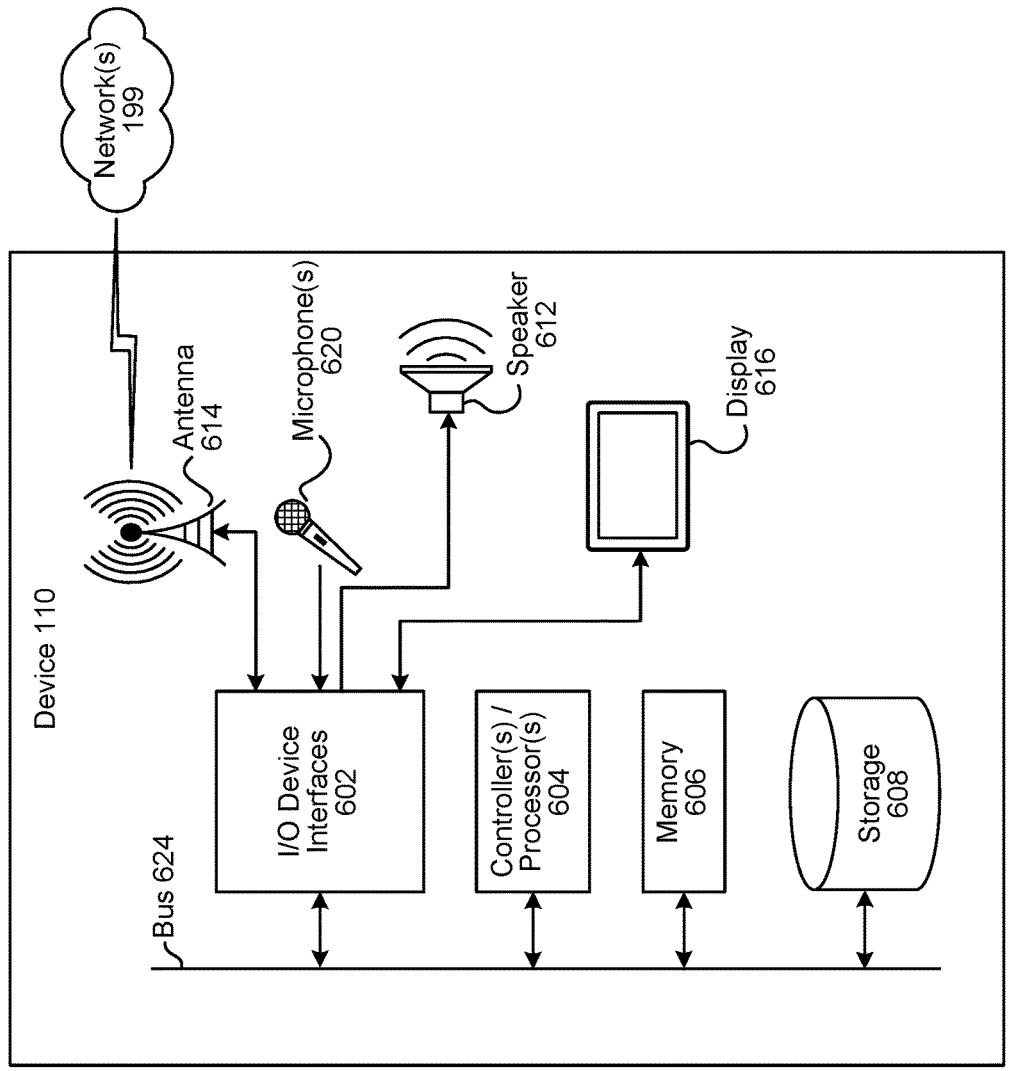

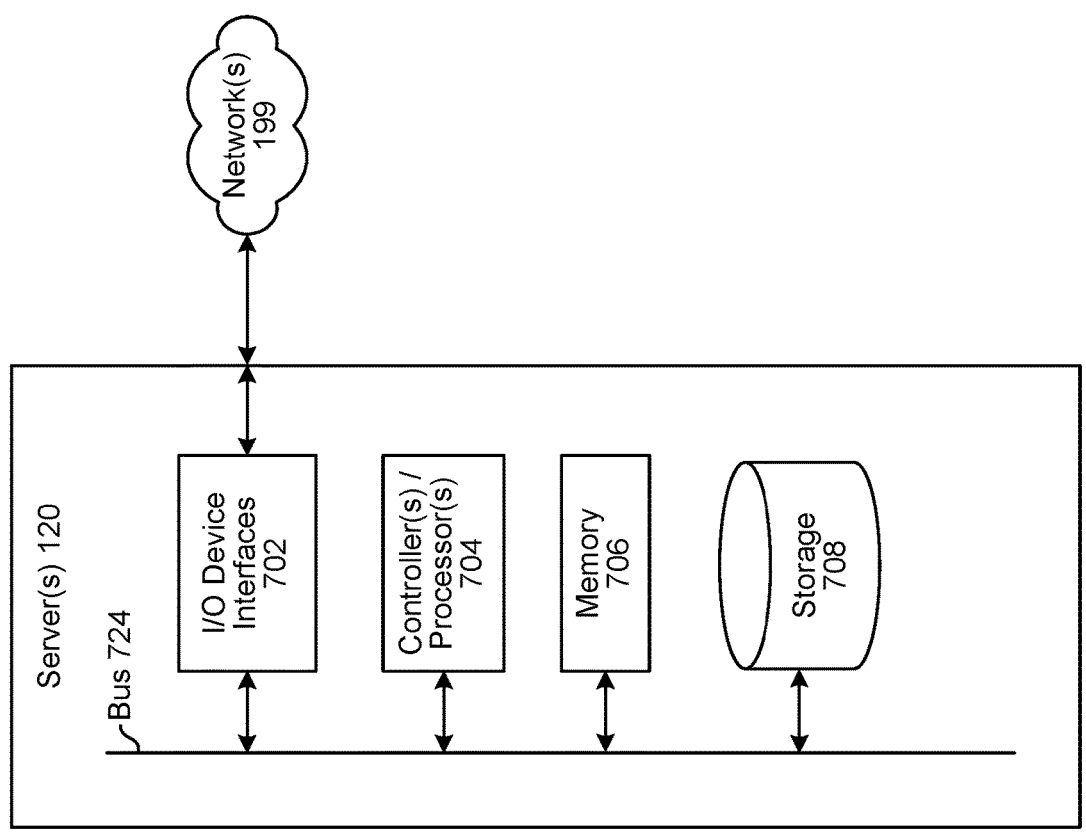

MULTI-SPEECHLET RESPONSE

BACKGROUND

Speech recognition systems have progressed to the point where humans can interact with computing devices using their voices. Such systems employ techniques to identify the words spoken by a human user based on the various qualities of a received audio input. Speech recognition processing combined with natural language understanding processing enable speech-based user control of a computing device to perform tasks based on the user's spoken commands. The combination of speech recognition processing and natural language understanding processing techniques is referred to herein as speech processing. Speech processing may also involve converting a user's speech into text data which may then be provided to speechlets.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 1A through 1C illustrate a system configured to enable multiple speechlet components to execute with respect to a single session according to embodiments of the present disclosure.

FIG. 2 illustrates the navigator objects and their content during session processing according to embodiments of the present disclosure.

FIG. 3 illustrates the updating of a first data structure during session processing according to embodiments of the present disclosure.

FIG. 4 is a conceptual diagram of components of a system according to embodiments of the present disclosure.

FIGS. 5A through 5C are a signal flow diagram illustrating system processing performed to call different speechlet components based on navigator objects according to embodiments of the present disclosure.

FIG. 6 is a block diagram conceptually illustrating example components of a device according to embodiments of the present disclosure.

FIG. 7 is a block diagram conceptually illustrating example components of a server according to embodiments of the present disclosure.

DETAILED DESCRIPTION

Figure 5A:
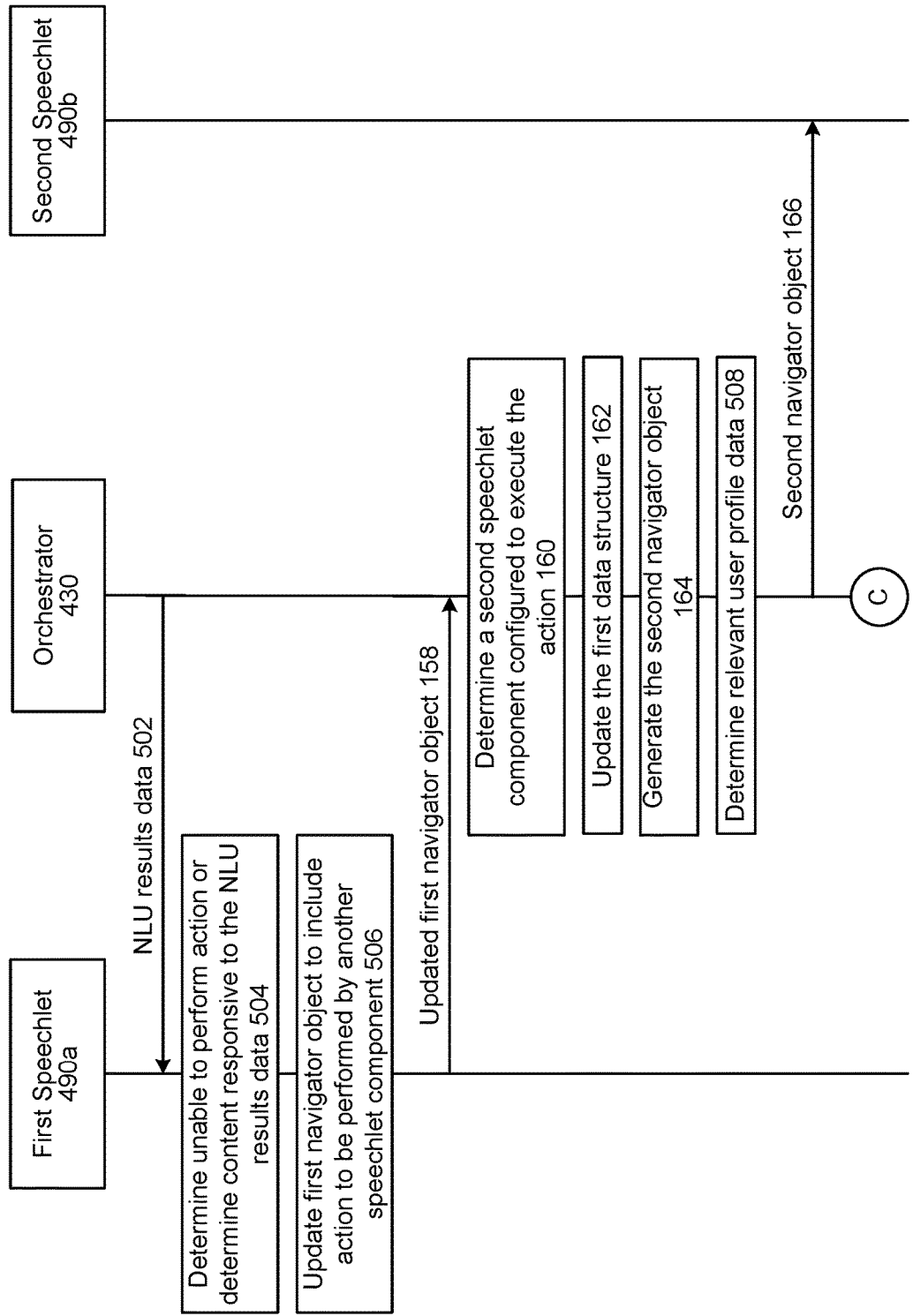

Automatic speech recognition (ASR) is a field of computer science, artificial intelligence, and linguistics concerned with transforming audio data representing speech into text data representative of that speech. Natural language understanding (NLU) is a field of computer science, artificial intelligence, and linguistics concerned with enabling computers to derive meaning from text data containing natural language. Text-to-speech (TTS) is a field of computer science, artificial intelligence, and linguistics concerned with enabling computers to output synthesized speech. ASR, NLU, and TTS may be used together as part of a speech processing system.

Systems may receive user input in the form of natural language. That is, a user may speak an input or provide a text input to the system and the user input may be in a form as if it were intended for another human.

Systems may receive user input that may be executed by a particular speechlet (e.g., skill). For example, a user may say to a device, local to the user and configured as part of the system, "play Adele music." The local device may send audio data representing the user speech to a distributed system that performs speech recognition processing and natural language processing to determine the user speech corresponds to a request for the system to output Adele music. The system may then cause a music speechlet to stream Adele music to the user local device.

A user may cause a system to establish a session. A "session" refers to a way for the system to associate user inputs and system responses pertaining to a single user dialog or conversation (by voice, typing, other natural language interaction, etc.) with the system. For example, a user may ask the system to schedule the user a plane ticket to Seattle. The system may schedule the plane ticket and output synthesized speech indicating the ticket was scheduled. The user may then ask the system what the weather is in Seattle and the system may output synthesized speech representing the weather in Seattle. The foregoing user inputs and system outputs may be considered part of a single session. The user inputs and system responses relating to a particular session may be associated with a particular session ID, with the session ID enabling the system to maintain a record of related user inputs, system processing, and system outputs. A session may be initiated by a user speaking a wakeword (e.g., "Alexa") or otherwise beginning an interaction with the system, by a user making a request to the system, by the system detecting a session start trigger (such as a timer, alarm, calendar event), or through other means. A session may be closed upon the system completing operations in response to user inputs, by a certain time period passing between user inputs, through a user instructing the system to close a session, or through other means.

A session may involve user inputs that are able to be processed by a single speechlet. For example, a user may ask the system where Seattle is and the system may output synthesized speech representing Seattle is in the state of Washington. The user may then ask the system what the population of Seattle is and the system may output synthesized speech representing the population of Seattle. A single speechlet may determine content responsive to both of the foregoing user inputs.

An opportunity for improving such systems is in enabling them to be able to leverage more than one speechlet to respond to a single utterance and/or in a single session. For example, a user may ask the system about menu contents of a restaurant and the system may output information regarding the menu. The user may then ask the system to schedule a reservation at the restaurant. A first speechlet may be configured to provide menu content but not schedule restaurant reservations. In the foregoing example, the system may open a first session when the system receives the first user input, close the first session once the menu content is output, and open a second session when the system receives the second user input.

By enabling a single session to be used to leverage more than one speechlet to respond to a single utterance, the system may maintain context (e.g., such may allow the system to communicate one speechlet's processing to another speechlet). Such enables one speechlet to provide another speechlet with data that may be used by the other speechlet for processing a user input. The present disclosure provides techniques for multiple speechlets and/or skills to process user inputs of a single session, thereby solving the foregoing and other technical problems.

For example, a user may ask a system about a restaurant and a first speechlet may cause the system to output information about the restaurant (e.g., address, phone number, type of restaurant, etc.) to the user. Then, the user may ask the system to make a reservation at the restaurant. The first speechlet may not be configured to schedule reservations. However, the first user input (i.e., asking for information about the restaurant) and the second user input (i.e., asking for a reservation to be made) may be part of a single session.

The first speechlet may cause a second speechlet, configured to schedule reservations, to process with respect to the second user input. The first speechlet may send context information, which the first speechlet received from the user and which may be useful for processing by the second speechlet (e.g., data used in processing the first user input, such as restaurant name, number of people, time and date of reservation, etc.), to the second speechlet.

The second speechlet then performs processes and interacts with the user as necessary (e.g., causes the system to obtain further user input needed to schedule the reservation). The second speechlet may indicate to the system when the second speechlet is finished processing with respect to the second user input. At this point, the user experience may be returned to the first speechlet. The first speechlet may then further interact with the user (e.g., ask the user if the user wants to schedule a ride to the restaurant, etc.) or the first speechlet may indicate it is done processing. If the first speechlet indicates it is done processing, the system may then close the session.

In the example above, the second speechlet may receive a user input that may be processed by a third speechlet, but not the second speechlet. The second speechlet may cause the third speechlet to processing with respect to the user input. Once the third speechlet is finished processing, the second speechlet may regain the user experience. The second speechlet may then further interact with the user or may pass the user experience back to the first speechlet (since the first speechlet originally transferred the user experience to the second speechlet).

The present disclosure thus provides techniques for a system to maintain a data structure that represents which speechlet called another speechlet. Each data structure, which may be referred to herein as a navigator object, may be specific to a single session. As a speechlet passes the user experience to a new speechlet, a layer may be added to the data structure. Moreover, as a speechlet passes the user experience to the speechlet that originally passed the user experience to the speechlet (e.g., resulting in a previous speechlet regaining the user experience), a layer may be removed from the data structure. The data structure may be many layers thick depending on how many times a speechlet passes the user experience to a new speechlet.

In an example, a user may provide a device with further input associated with a current session. The further input may correspond to a request to pay for a service. The further input may be sent to a first speechlet component that processed with respect to a previous user input of the same session. The first speechlet component may not be configured to process payments as the system may be configured with speechlet components that are specifically configured to process payments. Since the first speechlet component is not configured to process payments, the first speechlet component may cause the system to invoke a second speechlet component, specially configured to processing payments to process the user requested payment. Once the payment speechlet component is finished, the payment speechlet component may cause the first speechlet component to again be invoked by the system with respect to the session. Such a divisional configuration of the system, including individually operated (e.g., independent, sandboxed)) speechlet components and their respective processing (e.g., limiting payment processing to certain speechlet components) allows the system to protect sensitive user information from speechlet components not configured with parameters for protecting such sensitive user information or not permitted to receive another speechlet's proprietary information (e.g., user account information for accessing another speechlet).

FIGS. 1A through 1C illustrate a system configured to enable multiple speechlet components to execute with respect to a single session. Although the figures and discussion of the present disclosure illustrate certain operational steps of the system in a particular order, the steps described may be performed in a different order (as well as certain steps removed or added) without departing from the intent of the disclosure. Devices (110a/110b) local to a user 5 and one or more server(s) 120 may communicate across one or more networks 199.

The user 5 may speak an utterance to the device 110a. The device 110a may generate audio data representing the utterance and send the audio data to the server(s) 120, which the server(s) 120 receives (132). Alternatively, the user 5 may provide input text (e.g., via a virtual or other keyboard) to the device 110b. The device 110b may generate text data representing the text and send the text data to the server(s) 120, via a companion application downloaded on and executed by the device 110b, which the server(s) receives (132).

The server(s) 120 may associate (134) the user input (e.g., the received audio data or text data) with a first session identifier (ID) specific to a first session. The server(s) 120 may determine (136) a first speechlet component configured to process with respect to the first user input, represented in the first data. As used herein, a "speechlet component" refers to a speechlet, speechlet device, or other component operating within the server(s) 120, as well as a skill, skill device, or other component operating within a speechlet server(s) 125. For example, the server(s) 120 may perform NLU processing on text data (received from the device 110b or generated by performing ASR on audio data received from the device 110a) to determine the first user input requests invocation of the first speechlet component.

The server(s) 120 may also generate (138) a first data structure associated with the first session ID and including a first speechlet component ID specific to the determined first speechlet. As described below, the server(s) 120 updates the first data structure over the course of first session ID processes to maintain a record of which speechlet components causes other speechlet components to be called.

The server(s) 120 may send (140) the first user input (e.g., post-NLU text data) to the first speechlet component. The first speechlet component may then process with respect to the first user input to perform an action or determine content responsive to the first user input. For example, if the first user input asks about the weather, the content may be weather information. The first speechlet component then outputs the content or an indicator (e.g., text data) of an action performed in response to the first user input. The server(s) 120 receives (142) the content or indicator from the first speechlet component.

After receiving the content or indicator from the first speechlet component, the server(s) 120 updates (144) the first data structure to no longer include the first speechlet component ID, results in data structure, associated with the first session ID, having a null value. Since the first data structure is associated with the first session ID, the first data structure may persist until the first session is closed. Thus, as described herein, during the course of the first session, the first data structure may simply have a null value at times and be populated at times.

The server(s) 120 causes (146) the content or the indicator to be output to the user 5. For example, the system may perform TTS on text data representing the weather so the device 110*a* can output audio such as "tomorrow will be rainy." For further example, the system may perform TTS on text data representing a ride sharing trip was scheduled so the device 110*a* can output audio such as "I booked you a ride."

The user 5 may then speak another utterance to the device 110*a* or may provide further text to the device 110*b*. The device 110*a* may generate audio data representing the utterance or the device 110*b* may generate text data representing the text, depending on the situation. The device (110*a*/110*b*) may then send the audio data or text data to the server(s) 120, which the server(s) receives (148).

The server(s) 120 associates (150) the second user input (e.g., the received audio data or text data) with the first session identifier. The server(s) 120 also generates (152) a first navigator object (e.g., a data structure) associated with the first session ID. Navigator objects may be used by speechlet components to determine what processes they are to perform. The first navigator object may be a data structure with a null value. Since the first speechlet component processed the first user input associated with the first session identifier, the server(s) 120 sends (154) the second user input (e.g., post-NLU text data representing the second user input) and the first navigator object to the first speechlet component. Since the second user input is sent to the first speechlet component, the server(s) 120 updates (156) the first data structure to include the first speechlet component ID. The server(s) 120 may update the first data structure to include the first speechlet component ID prior to or contemporaneously with the server(s) 120 sending the second user input and the first navigator object to the first speechlet component.

The first speechlet component may determine it is unable to determine content or perform an action responsive to the second user input. For example, the first speechlet component may be configured to provide restaurant information but not schedule a restaurant reservation, and the second user input may request a restaurant reservation be scheduled. If this occurs, the first speechlet component may generate data representing an action to be performed by another speechlet component. The action may be responsive to the second user input. According to the foregoing example, the action may correspond to "schedule a restaurant reservation." The first speechlet component updates the first navigator object having the null value to include information representing the action to be performed.

The first speechlet component may also generate payload data associated with the action. The payload data may include information the first speechlet component gathered from user interactions performed in the first session, and which may be used by a different speechlet component in performing the action. For example, the payload data may include a number of people for a restaurant reservation, a time and date of the reservation, and/or other information.

The server(s) 120 receives (158) the updated first navigator object representing the action to be performed as well as the payload data, if payload data was generated by the first speechlet component. The server(s) 120 determines (160) a second speechlet component configured to execute the action represented in the updated first navigator object. The server(s) 120 updates (162) the first data structure to include a second speechlet component ID associated with the second speechlet component, resulting in the first data structure representing the first speechlet component causes the second speechlet component to be called.

The server(s) 120 also generates (164) a second navigator object associated with the first session ID and optionally including metadata representing the first speechlet component ID. The second navigator object may include the second speechlet component ID and data representing the action to be performed. The server(s) 120 sends (166) the second navigator object and payload data (if such was output by the first speechlet component) to the second speechlet component.

After receiving the navigator object and any associated payload data, the second speechlet component may proceed in several different ways. In one example, the second speechlet component may simply process with respect to the received payload data and the indicated action to perform an action and/or determine content responsive to the second user input. In another example, the second speechlet component may interact with the user 5 (e.g., by causing the system to output synthesized speech and receiving further user input responsive to the synthesized speech). The second speechlet component may then process with respect to the further user input and the previously received payload data and indicated action to perform an action and/or determine content responsive to the second user input. After the second speechlet component is finished processing, the second speechlet component updates the second navigator object to no longer include an indicator of the action or the second speechlet component ID, but that includes, for example, an indicator of a status of the second speechlet component's processes. Such an indicator of processing status may correspond to "success," "failure," an error code, or some other indicator. The second speechlet component may also generate payload data to accompany the updated second navigator object, with the payload data including information that may be useful to the first speechlet component.

The server(s) receives (168) the updated second navigator object and any associated payload from the second speechlet component. The server(s) 120 may determine (170) the updated first data structure (updated at step 162) indicates the first speechlet component is to be called. The server(s) 120 may determine such based on, for example, the updated first data structure representing the first speechlet component causes the second speechlet component to be called (e.g., representing the first speechlet component was the "calling" speechlet component that resulted in the second speechlet component being "called"). A "calling speechlet component" is a speechlet component that outputs data representing an action to be performed by another speechlet component. A "called speechlet component" is a speechlet component that is called by the server(s) 120 to perform the action output by the calling speechlet component.

The server(s) 120 generates (172) a third navigator object representing the status of the second speechlet component's processes. The server(s) 120 also updates (174) the first data structure to no longer include the second speechlet component ID, results in the updated first data structure only representing the first speechlet component ID. The server(s)

120 sends (176) the third navigator object, and any associated payload data, to the first speechlet component.

After receiving the updated navigator object and any associated payload, the first speechlet component may proceed in several different ways. In one example, the first speechlet component may further interact with the user 5 with respect to the first session. That is, the first speechlet component may perform further actions and/or determine further output content responsive to further user inputs associated with the first session ID. In another example, the first speechlet component may receive a further user input, determine the first speechlet component is unable to perform an action and/or determine content responsive to the further user input, and output a further updated navigator object that results in another speechlet component processing to perform another action and/or determine further content responsive to the further user input. In yet another example, the first speechlet component may determine it is finished interacting with the user 5 with respect to the first session. If the first speechlet component determines it is finished interacting with the user 5 with respect to the first session, the first speechlet component updates the third navigator object to be a data structure with a null value.

The server(s) 120 receives (178) the updated third navigator object from the first speechlet component. The server(s) 120 determines (180) the updated third navigator object includes null value and, thereafter, updates (182) the first data structure to remove the first speechlet component ID, resulting in the first data structure including a null value.

As described above, the first data structure may persist until the first session is closed. Thus, after updating the first data structure at step 182, the server(s) 120 either persists the first data structure having the null value until the first session is closed (at which time the first data structure may no longer persist) or until the server(s) 120 receives a further navigator object (associated with the first session ID) that includes an action to be performed (at which time the first data structure will be updated as described above).

As described above, the server(s) 120 (and more particularly an orchestrator component 430 of the server(s) 120) updates the first data structure. The system may be configured such that speechlet components are not able to update the first data structure. The system may be configured such that speechlet components are only able to update navigator objects as described above.

As described above, a first speechlet component may cause a second speechlet component to be called when a user requests an action or content that the first speechlet component cannot perform or provide, respectively. A first speechlet component may also or alternatively cause a second speechlet component to be called even if the first speechlet component can perform the requested action or provide the requested content. Such calling of a second speech component may be dictated by user preferences. For example, a first speechlet component may receive data representing a user input. The first speechlet component may be capable of responding to the user input, but the first speechlet component may receive an indicator that the user's profile includes a preference that a second speechlet component provide the desired response. Thus, even though the first speechlet component can provide a response, based on the user preference the first speechlet component will cause the second speechlet component to be called.

While it is described herein that a user of the system may be a human, one skilled in the art will appreciate that a user of the herein disclosed system may be another system. For example, a bot may interact with the herein disclosed system.

FIG. 2 illustrates navigator objects and their content during processing of the first session as described with respect to FIGS. 1A through 1C. For example, as described above the first navigator object sent to the first speechlet component may have a null value. The first speechlet component then updates the first navigator object to include action information and sends same to the server(s) 120. The server(s) 120 generates the second navigator object including the second speechlet component ID (the called speechlet component) and action information. The second speechlet component updates the second navigator object to simply include the status indicator representing the second speechlet component's processing and sends same to the server(s) 120. The server(s) 120 generates a third navigator object including the status indicator and sends same to the first speechlet component. The first speechlet component updates the third navigator object to have a null value and sends same to the server(s) 120.

As described above, the second speechlet component performs an action or determines content responsive to the second user input. However, the second speechlet component may alternatively perform an action or determine content responsive to a first portion of the second user input and determine it is unable to perform an action or determine content responsive to a second portion of the second user input. If this happens, the second speechlet component may update the second navigator object to include a further action to be performed by a further speechlet component. The second speechlet component may output the updated second navigator object and any associated payload, and the server(s) 120 can determine a third speechlet component to perform the further action and send updated new navigator object and associated payload to the determined third speechlet component. When the third speechlet component is done processing, it may update the new navigator object and output same to the server(s) 120. The server(s) 120 may send the updated new navigator object to the second speechlet component (since the second speechlet component output the new navigator object with the further action to be performed). The second speechlet component may then process as described above. In view of this foregoing description, one skilled in the art will appreciate that a first speechlet component may cause a second speechlet component to process, a second speechlet component may cause a third speechlet component to process, and so on. Likewise, one skilled in the art will appreciate that when a third speechlet component is finished processing, session processing may be returned to the second speechlet component and, when the second speechlet component is finished processing, session processing may be returned to the first speechlet component.

Each time session processing is passed to or returned to a speechlet component, the server(s) 120 may update the first data structure to gain or lose a layer of calling speechlet component information. The updating of the first data structure as described with respect to FIGS. 1A through 1C is illustrated in FIG. 3 to illustrate how the first data structure gains and losses layers. In view of FIG. 3, one skilled in the art will appreciate that the first data structure may include an ID of each calling speechlet component and associated called speechlet component. Thus, if the second speechlet component caused a third speechlet component to be called, the first data structure would be updated to include the third speechlet component's ID in addition to the second speechlet component ID and the first speechlet component ID. Likewise, if the third speechlet component causes a fourth speechlet component to be called, the first data structure would be updated to include the fourth speechlet component's ID in addition to the third speechlet component ID, the second speechlet component ID, and the first speechlet component ID.

The system may operate using various components as described in FIG. 4. The various components may be located on same or different physical devices. Communication between various components may occur directly or across a network(s) 199.

The device 110a may send audio data 411 to the server(s) 120. Upon receipt by the server(s) 120, the audio data 411 may be sent to an orchestrator component 430. The orchestrator component 430 may include memory and logic that enables the orchestrator component 430 to transmit various pieces and forms of data to various components of the system, as well as perform other operations as described herein.

The orchestrator component 430 sends the audio data 411 to an ASR component 450, which transcribes the audio data 411 into text data. The text data output by the ASR component 450 represents one or more than one (e.g., in the form of an N-best list) hypotheses representing a natural language utterance represented in the audio data 411. The ASR component 450 interprets the utterance in the audio data 411 based on a similarity between the audio data 411 and pre-established language models. For example, the ASR component 450 may compare the audio data 411 with models for sounds (e.g., subword units, such as phonemes, etc.) and sequences of sounds to identify words that match the sequence of sounds of the utterance represented in the audio data 411. The ASR component 450 sends the text data generated thereby to the orchestrator component 430, which in turn sends the text data to an NLU component 460. The text data output from the ASR component 450 may include a top scoring hypothesis or may include an N-best list including multiple hypotheses. An N-best list may additionally include a respective score associated with each hypothesis represented therein. Each score may indicate a confidence of ASR processing performed to generate the hypothesis with which the score is associated.

Alternatively, the device 110b may send text data 413 to the server(s) 120. Upon receipt by the server(s) 120, the text data 413 may be sent to the orchestrator component 430. The orchestrator component 430 may send the text data 413 to the NLU component 460.

The NLU component 460 attempts to make a semantic interpretation of the phrases or statements represented in the text data input therein. That is, the NLU component 460 determines one or more meanings associated with the phrases or statements represented in the text data based on words represented in the text data. The NLU component 460 determines an intent representing an action that a user desires be performed as well as pieces of the input text data that allow a device (e.g., the device 110a, the device 110b, the server(s) 120, a speechlet component 490, a speechlet server(s) 125, etc.) to execute the intent. For example, if the text data corresponds to "play Adele music," the NLU component 460 may determine an intent that the system output Adele music and may identify "Adele" as an artist. For further example, if the text data corresponds to "what is the weather," the NLU component 460 may determine an intent that the system output weather information associated with a geographic location of the device 110. For yet further example, if the text data corresponds to "book me a ride to my house," the NLU component 430 may determine an intent that the system schedule a ride sharing trip to a location corresponding to "my house."

A "speechlet" may be software running on the server(s) 120 that is akin to a software application running on a traditional computing device. That is, a speechlet component 490, implementing one or more speechlets, may enable the server(s) 120 to execute specific functionality in order to provide data, perform an action, or produce some other requested output. The server(s) 120 may be configured with more than one speechlet component 490. For example, a weather service speechlet component may enable the server(s) 120 to provide weather information, a car service speechlet component may enable the server(s) 120 to schedule a trip with respect to a taxi or ride sharing service, an order pizza speechlet component may enable the server(s) 120 to order a pizza with respect to a restaurant's online ordering system, a communications speechlet component may enable the system to perform messaging or multi-endpoint communications, etc. A speechlet component 490 may operate in conjunction between the server(s) 120 and other devices such as a local device 110 in order to complete certain functions. Inputs to a speechlet component 490 may come from various interactions and input sources.

The functionality described herein as a speechlet may be referred to using many different terms, such as an action, bot, app, or the like.

A speechlet component 490 may include hardware, software, firmware, or the like that may be dedicated to the particular speechlet component 490 or shared among different speechlet components 490. A speechlet component 490 may be part of the server(s) 120 (as illustrated in FIG. 4) or may be located at whole (or in part) with separate speechlet servers 125. A speechlet server(s) 125 may communicate with a speechlet component 490 within the server(s) 120 and/or directly with the orchestrator component 430 or with other components. Unless expressly stated otherwise, reference to a speechlet, speechlet device, or speechlet component may include a speechlet component operating within the server(s) 120 (for example as speechlet component 490) and/or speechlet component operating within a speechlet server(s) 425.

A speechlet component 490 may be configured to perform one or more actions. An ability to perform such action(s) may sometimes be referred to as a "skill." That is, a skill may enable a speechlet component 490 to execute specific functionality in order to provide data or produce some other output requested by a user. A particular speechlet component 490 may be configured to execute more than one skill/action. For example, a weather service skill may involve a weather speechlet component providing weather information to the server(s) 120, a car service skill may involve a car service speechlet component scheduling a trip with respect to a taxi or ride sharing service, an order pizza skill may involve a restaurant speechlet component ordering a pizza with respect to a restaurant's online ordering system, etc.

A speechlet component 490 may be in communication with one or more speechlet servers 125 implementing different types of skills. Types of skills include home automation skills (e.g., skills that enable a user to control home devices such as lights, door locks, cameras, thermostats, etc.), entertainment device skills (e.g., skills that enable a user to control entertainment devices such as smart TVs), video skills, flash briefing skills, as well as custom skills that are not associated with any pre-configured type of skill.

In certain instances, data provided by a speechlet component 490 may be in a form suitable for output to a user. In other instances, data provided by a speechlet component 490 may be in a form unsuitable for output to a user. Such an instance includes a speechlet component 490 providing text data while audio data is suitable for output to a user.

The server(s) 120 may include a TTS component 480 that generates audio data from text data using one or more different methods. The audio data generated by the TTS component 480 may then be output by a device 110 as synthesized speech. In one method of synthesis called unit selection, the TTS component 480 matches text data against a database of recorded speech. The TTS component 480 selects matching units of recorded speech and concatenates the units together to form audio data. In another method of synthesis called parametric synthesis, the TTS component 480 varies parameters such as frequency, volume, and noise to create audio data including an artificial speech waveform. Parametric synthesis uses a computerized voice generator, sometimes called a vocoder.

The server(s) 120 may include a user profile storage 470. The user profile storage 470 may include a variety of information related to individual users, groups of users, etc. that interact with the system. The user profile storage 470 may include one or more customer profiles. Each customer profile may be associated with a different customer ID. A customer profile may be an umbrella profile specific to a group of users. That is, a customer profile encompasses two or more individual user profiles, each associated with a respective user ID. For example, a customer profile may be a household profile that encompasses user profiles associated with multiple users of a single household. A customer profile may include preferences shared by all the user profiles encompassed thereby. Each user profile encompassed under a single customer profile may additionally include preferences specific to the user associated therewith. That is, each user profile may include preferences unique from one or more other user profiles encompassed by the same customer profile. A user profile may be a stand-alone profile or may be encompassed under a customer profile.

The system may be configured to incorporate user permissions and may only perform activities disclosed herein if approved by a user. As such, the sensors, systems, and techniques described herein would be typically configured to restrict processing where appropriate and only process user information in a manner that ensures compliance with all appropriate laws, regulations, standards, and the like. For example, the system may only receive and store child-related information (e.g., information required to interact with the user interface of the system) in a manner consistent with user permissions (e.g., with verified parental consent) and in accordance with applicable laws (e.g., the Children's Online Privacy Protection Act of 1998 (COPPA), the Children's Internet Protection Act (CIPA), etc.). The system and techniques can be implemented on a geographic basis to ensure compliance with laws in various jurisdictions and entities in which the component(s) of the system(s) and/or user are located.

The server(s) 120 may include a user recognition component 495 that recognizes one or more users associated with data input to the system. The user recognition component 495 may take as input the audio data 411, text data 413, and/or text data output by the ASR component 450. The user recognition component 495 determines scores indicating whether user input originated from a particular user. For example, a first score may indicate a likelihood that the user input originated from a first user, a second score may indicate a likelihood that the user input originated from a second user, etc. The user recognition component 495 also determines an overall confidence regarding the accuracy of user recognition operations. The user recognition component 495 may perform user recognition by comparing audio characteristics in the audio data 411 to stored audio characteristics of users. The user recognition component 495 may also perform user recognition by comparing biometric data (e.g., fingerprint data, iris data, etc.) received by the system in correlation with the present user input to stored biometric data of users. The user recognition component 495 may further perform user recognition by comparing image data (e.g., including a representation of at least a feature of a user) received by the system in correlation with the present user input with stored image data including representations of features of different users. The user recognition component 495 may perform additional user recognition processes, including those known in the art. Output of the user recognition component 495 may include a single user ID corresponding to the most likely user that originated the present input. Alternatively, output of the user recognition component 495 may include an N-best list of user IDs with respective scores indicating likelihoods of respective users originating the present input. The output of the user recognition component 495 may be used to inform NLU processing as well as processing performed by speechlet components 490.

Figure 5C:
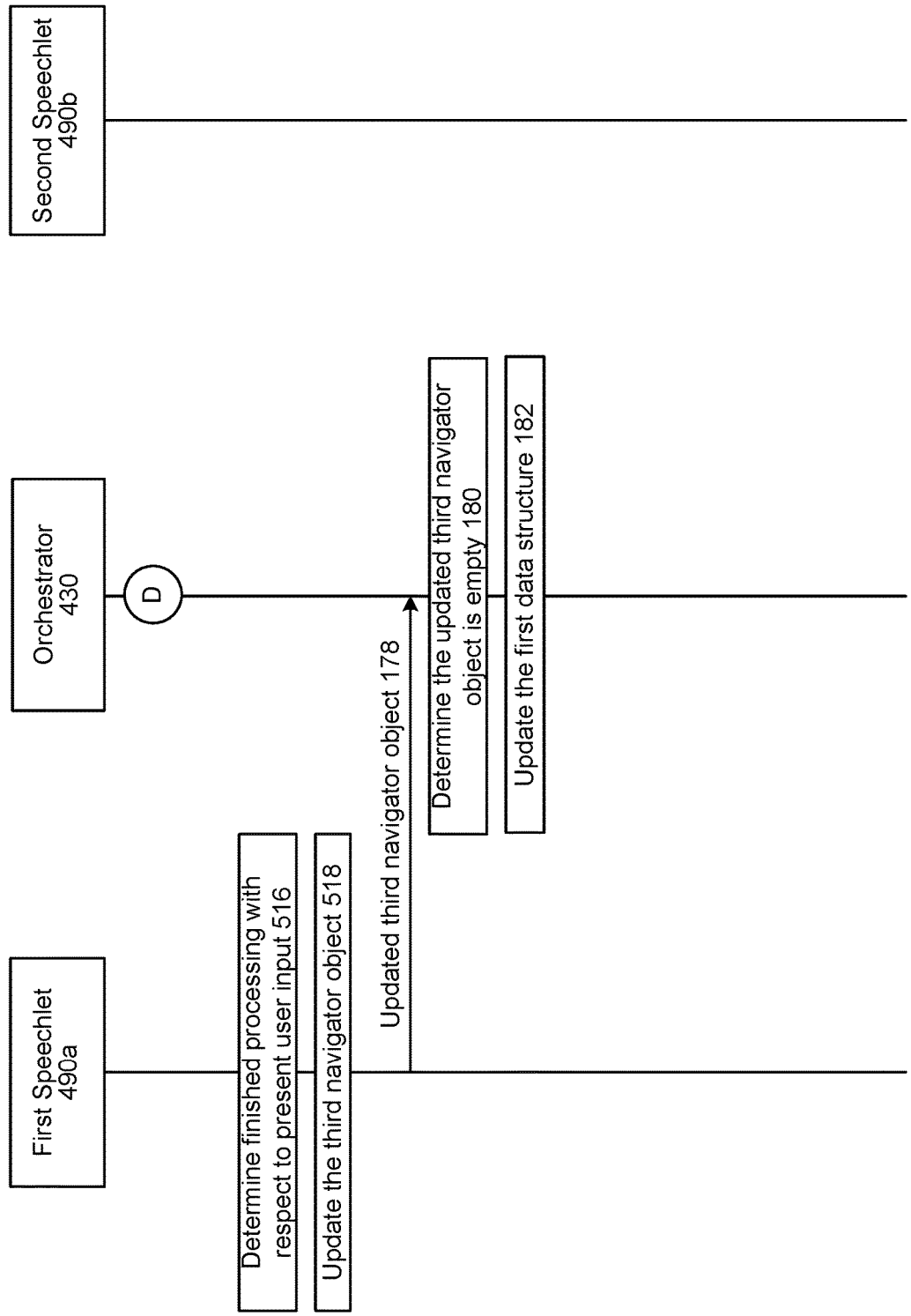

A user may provide an input to the system. The system processes the input to generate data representative of the input. The system then sends the generated data to a speechlet component associated with the input (e.g., a first speechlet component 490a that handled a previous user input associated with the same session ID). If the first speechlet component 490a outputs data representing an action to be performed by another speechlet component, the system generates a navigator object. FIGS. 5A through 5C illustrate system processes that may be involved in calling different speechlet components based on navigator objects.

The orchestrator component 430 sends (502) NLU results data to the first speechlet component 490a. The first speechlet component 490a then processes with respect to the NLU results data to determine (504) it is unable to perform an action or determine content responsive to the NLU results data. The first speechlet component 490a updates (506) the first navigator object to include the action to be performed by another speechlet component and sends (158) the updated first navigator object to the orchestrator component 430. The action to be performed by another speechlet component may be an action that is responsive to the NLU results data.

The orchestrator component 430 determines (160) a second speechlet component 490b configured to execute the action represented in the updated first navigator object. The orchestrator component 430 may have access to data representing various speechlet components and their capabilities. The system may be configured with various types of speechlet components. Thus, the orchestrator component 430 may create a listing of speechlet components, with each speechlet component in the list being associated with a respective ranking representing that speechlet component's likelihood of being able to perform the action represented in the sixth data.

The orchestrator component 430 may, at runtime, consider various data when determining the rankings of the speechlet components. The orchestrator component 430 may consider user preferences, represented in user profile data, associated with a user associated with the present user input, as determined by the user recognition component 495. For example, more than one speechlet component may be suited to execute with respect to a particular action, and the user profile data may indicate the user prefers one of the speechlet components over the other(s).

The orchestrator component 430 may also consider one or more user usage patterns, associated with user profile data, associated with a user associated with the present user input, as determined by the user recognition component 495. For example, user usage pattern data may represent a user uses one restaurant reservation speechlet component for scheduling breakfast reservations and another restaurant reservation speechlet component for scheduling dinner reservations. Accordingly, time of day, week, month, year, etc. may also be considered by the orchestrator component 430 when ranking the speechlet components.

The orchestrator component 430 may also consider the intents executable by speechlet components. For example, speechlet components may be configured to execute a <PlayMusic> intent, a <Purchase> intent, a <ReadAudioBook> intent, a <ScheduleReservation> intent, etc. The orchestrator component 430 may consider how closely an intent executable by a speechlet component relates to the action to be performed in determining the ranking of that speechlet component.

The orchestrator component 430 may also consider which actions a speechlet component is subscribed to perform. The system may be configured with a list of executable actions. A speechlet component may be subscribed to (e.g., associated with) one or more of the actions. The orchestrator component 430 may increase the ranking of a speechlet component that is subscribed to the action, and vice versa. Alternatively, instead of action subscription information simply being a signal considered by the orchestrator component 430 when ranking speechlet components, the orchestrator component 430 may determine which speechlet components are subscribed to the action and only rank those speechlet components.

The orchestrator component 430 may also consider skill enablement information. The orchestrator component 430 may determine user profile data, associated with a user associated with the present user input, as determined by the user recognition component 495. The orchestrator component 430 may use enabled skill information represented in the user profile data in ranking speechlet components with respect to their ability to execute the action. For example, a speechlet component's ranking may be increased if the speechlet component is represented as enabled in the user profile data and, conversely, may be decreased if the speechlet component is not represented as enabled (or is represented as disabled) in the user profile data. Alternatively, instead of speechlet component enablement information simply being a signal considered by the orchestrator component 430 when ranking speechlet components, the orchestrator component 430 may first determine the speechlet components enabled by the present user and only rank those enabled speechlet components.

The orchestrator component 430 may also consider speechlet component rating. Each speechlet component may be associated with a rating determined using feedback from various users of the system. The orchestrator component 430 may increase the ranking of a speechlet component in the list if the speechlet component is associated with a particularly high rating, as vice versa.

In some implementations, speechlet components may be associated and know the types of actions that may be performed by associated speechlet components. For example, pre-runtime, an information providing speechlet component may be associated with a restaurant reservation speechlet component and may know that the restaurant reservation speechlet component may be configured to schedule restaurant reservations. In such an implementation, the first speechlet component may output the action to be performed as well as an identifier of a speechlet component that may perform the action. The orchestrator component 430 may follow the first speechlet component's instruction. Alternatively, the orchestrator component 430 may simply consider the first speechlet component's recommendation as one signal in ranking speechlet components as described above.

After the orchestrator component 430 determines the second speechlet component to execute the action, the orchestrator component 430 updates (162) the first data structure and generates (164) the second navigator object representing the first speechlet component 490a is causing the second speechlet component 490b to be called.

The orchestrator component 430 may also determine (508) user profile data that the second speechlet component may use to perform the action. The orchestrator component 430 may determine the user profile data associated with a user ID (or top scoring user ID) output by the user recognition component 495. For example, the orchestrator component 430 may determine account credentials that are represented in the user profile data and associated with the second speechlet component. The orchestrator component 430 may also determine user profile data representing various characteristics of the user (e.g., age, gender, etc.). If the orchestrator component 430 received payload data from the first speechlet component, the orchestrator component 430 may update such payload data to include the determined user profile data. The orchestrator component 430 may need to determine such user profile data because the system may be configured to prevent speechlet components from having direct access to user profile data. This creates an added layer of privacy between sensitive user information and third party systems.

The orchestrator component 430 sends (166), to the second speechlet component 490b, the second navigator object and any payload data and user profile data associated with the second navigator object. The orchestrator component may send the user profile data to the second speechlet component 490b as part of the payload data, or separately.

The second speechlet component 490b performs (510) the action represented in the second navigator object using any associated payload and/or user profile data. As described, such processing may involve the second speechlet component 490b performing the action in its entirety or the second speechlet component 490b generating updating the second navigator object to include second action information, resulting in a third speechlet component executing with respect to the second action.

After the second speechlet component 490b is finished processing, the second speechlet component 490b generates (512) results data. The results data may simply represent a result of the second speechlet's processing, such as "success," "failure," and the like. Alternatively, the results data may have a null value that is simply meant to cause control of the session to be passed back to the original calling speechlet component (e.g., the first speechlet component 490a). The second speechlet component 490b updates (514) the secondnavigator object to include the results data.

The orchestrator component 430 receives (168) the updated second navigator object from the second speechlet component 490b and determines (170) the previously updated first data structure represents the first speechlet component 490a is to be called. For example, the orchestrator component 430 may determine the updated second navigator object includes the results data and, based thereon, analyze the current first data structure to determine the first speechlet component 490a caused the second speechlet component 490b to be called.

The orchestrator component 430 generates (172) the third navigator object and updates (174) the first data structure. The orchestrator component 430 sends (176) the third navigator object to the first speechlet component 490a.

The first speechlet component 490a determines (516) the first speechlet component 490a is finished processing with respect to the present user input and updates (518) the third navigator object to have a null value based on the first speechlet component 490a determining it is finished processing and there is no further action to be taken by another speechlet component.

The orchestrator component 430 receives (178) the updated third navigator object and determines (180) the updated third navigator object has a null value. Based on the third navigator object having a null value, the orchestrator component 430 updates (182) the first data structure to have a null value since there is no outstanding processing being performed by a speechlet component with respect to the present session.

The orchestrator component 430 may only be configured to process navigator objects received from speechlet components, but not be configured to process payload data associated with the navigator objects. Thus, the format of payload data may be uninfluenced by the orchestrator component 430.

The foregoing description describes situations in which a calling speechlet component (e.g., the first speechlet component) always receives results data from a called speechlet component (e.g., the second speechlet component), even if the called speechlet component's processing resulted in an error. Alternatively, the system may be configured such that the calling speechlet component only receives results data from the called speechlet component in certain situations. For example, the calling speechlet component may indicate that it does not need (or want) to receive data indicating the results of the called speechlet component's processing. In this situation, the called speechlet component could indicate to the orchestrator component 430 when the called speechlet component is done processing, and the orchestrator component 430 could send updated new navigator object, without the results data, to the original calling speechlet component. This effectively results in the calling speechlet component regaining control of the session without the calling speechlet component knowing results of the called speechlet component's processing.

The foregoing description also describes session control being passed back to a calling speechlet component in response to a called speechlet component sending the orchestrator component 430 an updated navigator object with results data. Alternatively, session control may be passed back to a calling speechlet component in response to a device event. For example, the called speechlet component may be a music speechlet component that causes audio data corresponding to music to be output by a device 110. When the device 110 is done outputting the music audio, the device 110 may indicate such to the system. In response to receiving the indication, the orchestrator component 430 may generate a new navigator object and send it to the original calling speechlet component.

In addition to the calling speechlet component providing the orchestrator component 430 with data representing an action to be performed by another speechlet component, the calling speechlet component may also provide the orchestrator component 430 with a token. The token is a unique identifier generated by the calling speechlet component. When the orchestrator component 430 provides the original calling speechlet component with the new navigator object (e.g., the above described second navigator object), resulting in session control being passed back to the original calling speechlet component, the orchestrator component 430 may also send the calling speechlet component the token. The calling speechlet component may use the token as a key to determine where the calling speechlet component was in its processing schema (e.g., determine the context that existed when the calling speechlet sent the token to the orchestrator component 430) so the original calling speechlet component does not need to again start at the beginning of its processing schema. The orchestrator component 430 may cause the token to be stored and associated with the first session ID. Moreover, the called speechlet component may never receive the token. That is, the token may simply be for the calling speechlet component's use.

FIG. 6 is a block diagram conceptually illustrating a device 110 that may be used with the system. FIG. 7 is a block diagram conceptually illustrating example components of a remote device, such as the server(s) 120, which may assist with ASR processing, NLU processing, etc. Multiple servers 120 may be included in the system, such as one or more servers 120 for performing ASR processing, one or more servers 120 for performing NLU processing, etc. In operation, each of these devices (or groups of devices) may include computer-readable and computer-executable instructions that reside on the respective device (110/120), as will be discussed further below.

Each of these devices (110/120) may include one or more controllers/processors (604/704), which may each include a central processing unit (CPU) for processing data and computer-readable instructions, and a memory (606/706) for storing data and instructions of the respective device. The memories (606/706) may individually include volatile random access memory (RAM), non-volatile read only memory (ROM), non-volatile magnetoresistive memory (MRAM), and/or other types of memory. Each device (110/120) may also include a data storage component (608/708) for storing data and controller/processor-executable instructions. Each data storage component (608/708) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (602/702).

Computer instructions for operating each device (110/120) and its various components may be executed by the respective device's controller(s)/processor(s) (604/704), using the memory (606/706) as temporary "working" storage at runtime. A device's computer instructions may be stored in a non-transitory manner in non-volatile memory (606/706), storage (608/708), or an external device(s). Alternatively, some or all of the executable instructions may be embedded in hardware or firmware on the respective device in addition to or instead of software.

Each device (110/120) includes input/output device interfaces (602/702). A variety of components may be connected through the input/output device interfaces (602/702), as will be discussed further below. Additionally, each device (110/120) may include an address/data bus (624/724) for conveying data among components of the respective device. Each component within a device (110/120) may also be directly connected to other components in addition to (or instead of) being connected to other components across the bus (624/724).

Referring to FIG. 6, the device 110 may include input/output device interfaces 602 that connect to a variety of components such as an audio output component such as a speaker 612, a wired headset or a wireless headset (not illustrated), or other component capable of outputting audio. The device 110 may also include an audio capture component. The audio capture component may be, for example, a microphone 620 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 616 for displaying content.

Via antenna(s) 614, the input/output device interfaces 602 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (602/702) may also include communication components that allow data to be exchanged between devices such as different physical servers in a collection of servers or other components.

The components of the device(s) 110 and the server(s) 120 may include their own dedicated processors, memory, and/or storage. Alternatively, one or more of the components of the device(s) 110 and the server(s) 120 may utilize the I/O interfaces (602/702), processor(s) (604/704), memory (606/706), and/or storage (608/708) of the device(s) 110 and server(s) 120, respectively. Thus, the ASR component 450 may have its own I/O interface(s), processor(s), memory, and/or storage; the NLU component 460 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110 and the server(s) 120, as described herein, are illustrative, and may be located as a stand-alone device or may be included, in whole or in part, as a component of a larger device or system.

Figure 8:
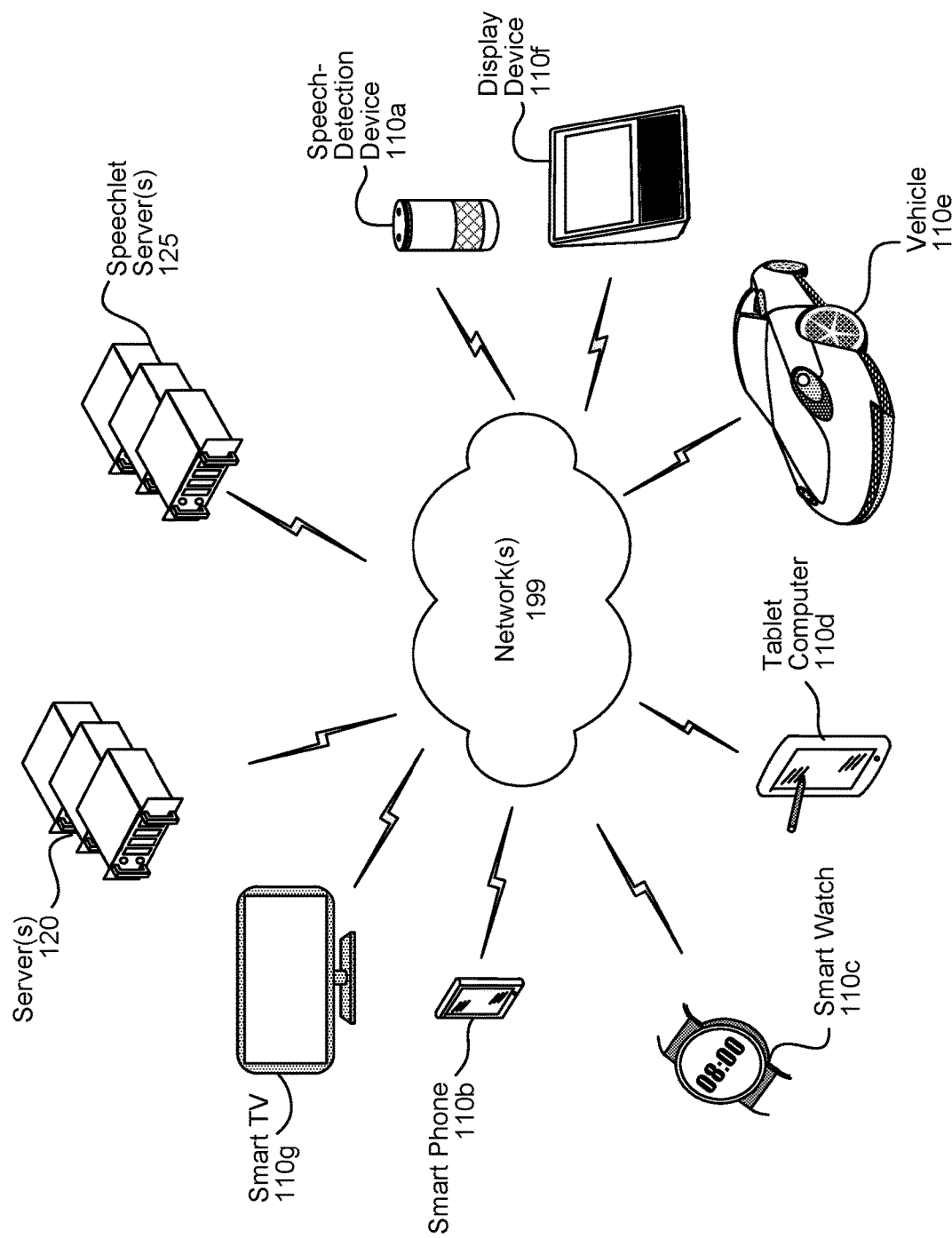
FIG. 8 illustrates an example of a computer network for use with the speech processing system.

As illustrated in FIG. 8, multiple devices (110a-110g, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, and/or a smart television 110g may be connected to the network(s) 199 through a wireless service provider, over a WiFi or cellular network connection, or the like. Other devices are included as network-connected support devices, such as the server(s) 120, the speechlet server(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 450, the NLU component 460, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method, comprising:
    receiving, from a first device during a first session, first audio data corresponding to a natural language processing request;
    performing speech processing on the first audio data to generate first natural language understanding (NLU) results data;
    determining, based at least in part on the first NLU results data, an updated natural language processing request;
    determining the updated natural language processing request corresponds to a request to perform a first action related to a first component;
    generating first data including a first component identifier, the first data associated with the first session;
    generating second data including a null value, the second data associated with the first session;
    sending, to the first component, at least a portion of the first NLU results data;
    sending, to the first component, the second data;
    receiving, from the first component, updated second data indicating a first action to be executed by another component, wherein the first action is to be performed to determine data response to the natural language processing request;
    determining user profile data associated with the natural language processing request;
    determining an association between the user profile data and a second component configured to execute the first action;
    determining an association between the user profile data and the first action;
    determining a plurality of components configured to execute the first action with regard to the user profile data, the plurality of components including the second component;
    determining, based at least in part on supplemental data, ranking data representing a likelihood of an ability of the second component to perform processing with regard to the first action;
    determining, based at least in part on the association and the ranking data, that the second component is to be selected from the plurality of components to execute the first action with regard to the user profile data;
    generating updated first data to include a second component identifier and the first component identifier;
    generating third data indicating the first action, the third data associated with the first session;
    sending, to the second component, the third data;
    causing, the second component to use the third data to perform processing with respect to the first action;
    generate, by the second component, second NLU results data indicating processing performed with respect to the first action;
    receiving, from the second component, updated third data indicating first results of processing performed by the second component;
    after receiving the updated third data, generating updated first data to remove the second component identifier;
    generating fourth data indicating the first results, the fourth data associated with the first session;
    sending, to the first component, the fourth data;
    receiving, from the first component, updated fourth data including a null value; and
    after receiving the updated fourth data, generating an updated first data to remove the first component identifier.

2. The method of claim 1, further comprising:
    determining, in the user profile data, login credentials associated with the second component;
    associating the login credentials with the second data; and
    sending the login credentials to the second component.

3. The method of claim 1, further comprising:
    receiving, from the second component, fifth data indicating a second action to be executed by another component, the fifth data associated with the first session;
    identifying a third component configured to execute the second action;
    after identifying the third component, generating updated first data to include the first component identifier, the second component identifier, and a third component identifier;
    generating sixth data indicating the second action, the sixth data associated with the first session;
    sending, to the third component, the sixth data;
    receiving, from the third component, updated sixth data indicating second results of processing performed by the third component;
    after receiving the updated sixth data, generating updated first data to remove the third component identifier;
    generating seventh data indicating the second results, the seventh data associated with the first session; and
    sending the seventh data to the second component,
    wherein the updated third data is received after sending the seventh data.

4. The method of claim 1, further comprising:
    receiving, from the first device, second audio data representing a second utterance;
    performing speech processing on the second audio data to generate second NLU results data representing the second utterance;
    determining the second NLU results data corresponds to a request to perform a second action related to the first component;
    generating fifth data including the first component identifier the fifth data associated with the first session;
    generating sixth data including a null value, the sixth data associated with the first session;
    sending, to the first component, at least a portion of the second NLU results data;
    determining the user profile data represents a third component is to execute the second action;
    sending, to the first component, first data representing the third component is to execute the second action;
    sending, to the first component, the sixth data;
    receiving, from the first component, updated sixth data indicating the third component is to be invoked;
    generating updated fifth data to include a third component identifier and the first component identifier;
    generating seventh data indicating the second action the seventh data associated with the first session; and
    sending, to the third component, the seventh data.

5. A method, comprising:

using, during a first session, input data corresponding to a natural language processing request and a first component to determine first natural language understanding (NLU) results data;

determining, based at least in part on the first NLU results data, an updated natural language processing request;

receiving, from the first component, first data representing a first action to be executed by another component, wherein the first action is to be performed to determine data responsive to the updated natural language processing request;

determining user profile data associated with the natural language processing request;

determining an association between the user profile data and the first action;

determining a plurality of components configured to execute the first action with regard to the user profile data, the plurality of components including a second component;

determining, based at least in part on supplemental data, ranking data representing a likelihood of an ability of the second component to perform processing with regard to the first action;

determining, based at least in part on the association and the ranking data, that the second component is to be selected from the plurality of components to execute the first action;

sending the first data to the second component;

causing the second component to use the first data to perform processing with respect to the first action;

generating, by the second component, second NLU results data indicating processing performed with respect to the first action;

receiving, from the second component, updated first data indicating first results of processing performed by the second component;

generating second data indicating the first results, the second data associated with the first session;

sending the second data to the first component; and causing, based at least in part on receipt of the second data by the first component, the first component to resume processing.

6. The method of claim 5, further comprising:

receiving, from the second component, a third data indicating a second action to be executed by another component, the third data associated with the first session;

identifying a third component configured to execute the second action;

generating a fourth data indicating the second action, the fourth data associated with the first session;

sending the fourth data to the third component, the fourth data causing the third component to perform processing with respect to the second action;

receiving, from the third component, updated fourth data indicating second results of processing performed by the third component;

generating fifth data indicating the second results, the fifth data associated with the first session; and sending the fifth data to the second component, the fifth data causing the second component to resume processing, wherein the updated first data is received after sending the fifth data.

7. The method of claim 5, further comprising:

prior to causing the first component to perform processing with respect to the first NLU results data, generating a third data including a first component identifier, the third data associated with the first session;

after receiving the first data and prior to sending the first data, generating updated third data to include a second component identifier, resulting in the third data including the first component identifier and the second component identifier; and after receiving the updated first data and prior to sending the second data, generating updated third data to remove the second component identifier.

8. The method of claim 7, further comprising:

receiving, from the first component, updated second data having a null value; and after receiving the updated second data, generating updated third data to remove the first component identifier the third data associated with the first session.

9. The method of claim 5, further comprising:

receiving, from the first component, third data representing the first component is to be restricted from receiving results of processing performed by other components;

receiving, from the first component, fourth data representing a second action to be executed by another component;

identifying a third component configured to execute the second action;

generating fifth data indicating the second action;

sending the fifth data to the third component, the fifth data causing the third component to perform processing with respect to the second action;

receiving, from the third component, updated fifth data indicating second results of processing performed by the third component;

after receiving the updated fifth data and based at least in part on the second data, generating sixth data having a null value; and sending the sixth data to the first component, the sixth data causing the first component to resume processing.

10. The method of claim 5, further comprising:

receiving, from a first user device, third data representing an event has occurred.

11. The method of claim 5, further comprising:

receiving, from the first component, third data representing a context of processing experienced by the first component when the first data was received; and after receiving the updated first data, sending the third data to the first component.

12. The method of claim 5, further comprising:

determining, in the user profile data, login credentials associated with the second component;

associating the login credentials with the first data; and sending the login credentials to the second component.

13. A computing system, comprising:

at least one processor; and at least one memory comprising instructions that, when executed by the at least one processor, cause the system to:

use, in a first session, input data corresponding to a natural language processing request and a first component to determine first natural language understanding (NLU) results data;

determine, based at least in part on the first NLU results data, an updated natural language processing request;

receive, from the first component, first data representing a first action to be executed by another component, wherein the first action is to be performed to determine data responsive to the updated natural language processing request;

determine user profile data associated with the natural language processing request;

determine an association between the user profile data and the first action;

determine a plurality of components configured to execute the first action with regard to the user profile data, the plurality of components including a second component;

determine, based at least in part on supplemental data, ranking data representing a likelihood of an ability of the second component to perform processing with regard to the first action;

determine, based at least in part on the association and the ranking data, that the second component is to be selected from the plurality of components to execute the first action;

send the first data to the second component;

causing the second component to use the first data to perform processing with respect to the first action;

generate, by the second component, second NLU results data to indicate processing performed with respect to the first action;

receive, from the second component, updated first data indicating first results of processing performed by the second component;

generate second data indicating the first results, the second data associated with the first session;

send the second data to the first component; and causing, based at least in part on receipt of the second data by the first component, the first component to resume processing.

14. The computing system of claim 13, wherein the at least one memory further comprises instructions that, when executed by the at least one processor, further cause the system to:

receive, from the second component, third data indicating a second action to be executed by another component, the third data associated with the first session;

identify a third component configured to execute the second action;

generate fourth data indicating the second action, the fourth data associated with the first session;

send the fourth data to the third component, the fourth data causing the third component to perform processing with respect to the second action;

receive, from the third component, updated fourth data indicating results of processing performed by the third component;

generate fifth data indicating the second action, the fifth data associated with the first session; and send the fifth data to the second component, the fifth data causing the second component to resume processing, wherein the updated first data is received after sending the fifth data.

15. The computing system of claim 13, wherein the at least one memory further comprises instructions that, when executed by the at least one processor, further cause the system to:

prior to causing the first component to perform processing with respect to the first NLU results data, generate third data including a first component identifier, the third data associated with the first session;

after receiving the first data and prior to sending the first data, generate updated third data to include a second component identifier, resulting in the third data including the first component identifier and the second component identifier; and after receiving the updated first data and prior to sending the second data, generate updated third data to remove the second component identifier.

16. The computing system of claim 15, wherein the at least one memory further comprises instructions that, when executed by the at least one processor, further cause the system to:

receive, from the first component, updated second data having a null value; and after receiving the updated second data, generate updated third data to remove the first component identifier, the third data associated with the first session.

17. The computing system of claim 13, wherein the at least one memory further comprises instructions that, when executed by the at least one processor, further cause the system to:

receive, from the first component, third data representing the first component is to be restricted from receiving results of processing performed by other components;

receive, from the first component, fourth data representing a second action to be executed by another component;

identify a third component configured to execute the second action;

generate fifth data indicating the second action;

send the fifth data to the third component, the fifth data causing the third component to perform processing with respect to the second action;

receive, from the third component, updated fifth data indicating second results of processing performed by the third component;

after receiving the updated fifth data and based at least in part on the second data, generate sixth data having a null value; and send the sixth data to the first component, the sixth data causing the first component to resume processing.

18. The computing system of claim 13, wherein the at least one memory further comprises instructions that, when executed by the at least one processor, further cause the system to:

receive, from a first user device, third data representing an event has occurred.

19. The computing system of claim 13, wherein the at least one memory further comprises instructions that, when executed by the at least one processor, further cause the system to:

receive, from the first component, third data representing a context of processing experienced by the first component when the first data was received; and after receiving the updated first data, send the third data to the first component.

20. The computing system of claim 13, wherein the at least one memory further comprises instructions that, when executed by the at least one processor, further cause the system to:

determine, in the user profile data, login credentials associated with the second component;

associate the login credentials with the first data; and send the login credentials to the second component.

21. The method of claim 5, wherein the association between the user profile data and the second component was created prior to the first session.

22. The computing system of claim 13, wherein the association between the user profile data and the second component was created prior to the first session.

\* \* \* \* \*